(12) United States Patent
Sayers et al.

(10) Patent No.: US 12,117,581 B2
(45) Date of Patent: Oct. 15, 2024

(54) SEISMIC PORE-PRESSURE PREDICTION USING PRESTACK SEISMIC INVERSION

(71) Applicant: Schlumberger Technology Corporation, Sugar Land, TX (US)

(72) Inventors: Colin Sayers, Katy, TX (US); Lennert den Boer, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 650 days.

(21) Appl. No.: 17/281,353

(22) PCT Filed: Sep. 30, 2019

(86) PCT No.: PCT/US2019/053833
§ 371 (c)(1),
(2) Date: Mar. 30, 2021

(87) PCT Pub. No.: WO2020/072367
PCT Pub. Date: Apr. 9, 2020

(65) Prior Publication Data
US 2022/0043176 A1 Feb. 10, 2022

Related U.S. Application Data

(60) Provisional application No. 62/741,041, filed on Oct. 4, 2018.

(51) Int. Cl.
*G01V 1/50* (2006.01)
*E21B 49/00* (2006.01)

(52) U.S. Cl.
CPC ........... *G01V 1/50* (2013.01); *E21B 49/00* (2013.01); *E21B 2200/20* (2020.05);
(Continued)

(58) Field of Classification Search
CPC ............ G01V 1/50; G01V 2210/6222; G01V 2210/6226; G01V 2210/6248; E21B 2200/20
See application file for complete search history.

(56) References Cited

U.S. PATENT DOCUMENTS

| | | | |
|---|---|---|---|
| 6,977,866 B2 * | 12/2005 | Huffman | G01V 1/284 702/14 |
| 2005/0197780 A1 * | 9/2005 | Moos | G01V 1/50 702/14 |

(Continued)

FOREIGN PATENT DOCUMENTS

| CN | 105445791 A | 3/2016 |
|---|---|---|
| CN | 105700017 A | 6/2016 |

OTHER PUBLICATIONS

Chopra et al., "Velocity determination for pore pressure prediction", CSEG Recorder, Apr. 2006 | vol. 31 No. 04 (Year: 2006).*

(Continued)

*Primary Examiner* — Manuel L Barbee
(74) *Attorney, Agent, or Firm* — Diana N. Onyemize

(57) ABSTRACT

A method of predicting pore pressure based on seismic data can include obtaining seismic inversion data based in part on seismic data collected from a formation. The method also includes calculating a pore-pressure transform, wherein the pore-pressure transform comprises parameters derived using measured pore pressure data, upscaled sonic logs, and density logs, wherein the pore-pressure transform comprises an objective function to reduce unphysical variations in predicted pore pressure corresponding to depth. Additionally, the method can include adjusting the pore-pressure transform for sampling bias caused by pore pressure measurements being restricted to a plurality of lithologies by accounting for a difference between upscaled seismic velocities and average sonic velocities within each of the lithologies (Continued)

gies. Furthermore, the method can include generating pore pressure prediction values based on the pore-pressure transform for the lithologies and the seismic inversion data, and modifying a seismic model based on the generated pore pressure prediction values.

22 Claims, 13 Drawing Sheets

(52) U.S. Cl.
CPC ............... *G01V 2210/1299* (2013.01); *G01V 2210/1429* (2013.01); *G01V 2210/6222* (2013.01); *G01V 2210/6226* (2013.01); *G01V 2210/6248* (2013.01)

(56) References Cited

U.S. PATENT DOCUMENTS

2009/0187391 A1* 7/2009 Wendt ................... G01V 11/00 702/14
2017/0335675 A1 11/2017 Lee et al.

OTHER PUBLICATIONS

Singha, Dip Kumar et al., "Pore Pressure Prediction from Seismic Data using Neural Network", 10th Biennial International Conferece and Exposition, 3013, 6 pages.
Extended Search Report issued in European Patent Application No. 19868752.7 dated May 20, 2022, 8 pages.
Backus, G.E. (1962) Long-wave elastic anisotropy produced by horizontal layering: Journal of Geophysical Research, 67, 4427-4440.
Biot, M.A. (1956) Theory of propagation of elastic waves in a fluid-saturated porous solid II: higher frequency range, Journal of the Acoustical Society of America, vol. 28, No. 2, 179-191.
Bowers, G.L. (1995) Pore-pressure estimation from velocity data: Accounting for pore-pressure mechanisms besides undercompaction: SPE Drilling and Completion, 10, 89-95.
Den Boer, L.D., Sayers, C.M., Nagy, Z.R., Hooyman, P.J., & Woodward, M.J. (2006). Pore-pressure prediction using well-conditioned seismic velocities. First Break, 24, 43-49.
Eaton, B. A. (1975) The equation for geopressure prediction from well logs: SPE 5544 (11 pages).
Goodway, B., Chen, T., and Downton, J. (1997). Improved AVO fluid detection and lithology discrimination using Lamé petrophysical parameters "λp", "μp", & "Nμ fluid stack", from P and S inversions. In SEG Technical Program Expanded Abstracts 1997 (pp. 183-186). Society of Exploration Geophysicists.
Nichols, D. (2012) Resolution in seismic inversion—spectral gap or spectral overlap, which is harder to handle?, 74th EAGE Conference and Exhibition, Copenhagen, Denmark, Jun. 4-7, 2012.
Sayers, C.M., Johnson, G.M., & Denyer, G. (2002). Predrill pore-pressure prediction using seismic data. Geophysics, 67(4), 1286-1292.
Ursin, B., & Tjaland, E. (1996). The information content of the elastic reflection matrix. Geophysical Journal International, 125, 214-228.
International Search Report and Written Opinion issued in the PCT Application PCT/US2019/053833, dated Nov. 29, 2019 (10 pages).
International Preliminary Report on Patentability in the PCT Application PCT/US2019/053833 dated Apr. 15, 2021, 7 pages.

* cited by examiner

SEISMIC PORE-PRESSURE PREDICTION USING PRESTACK SEISMIC INVERSION

CROSS-REFERENCE TO RELATED APPLICATIONS

This application claims priority to U.S. Provisional Patent Application No. 62/741,041, which was filed on Oct. 4, 2018, and is incorporated herein by reference in its entirety.

BACKGROUND

Pore pressure is difficult to measure in low permeability rocks such as unconventional reservoirs. However, pore pressure affects drilling, hydrocarbon production, and geomechanics applications such as hydraulic fracturing, etc. Pore pressure is, therefore, a parameter that can be used for developing unconventional reservoirs, and a predrill estimate of pore pressure facilitates development of unconventional reservoirs.

In offshore environments, such as the Gulf of Mexico, among others, seismic velocities have been successfully used for pore-pressure prediction. Seismic velocity-based pore-pressure prediction is successful in such environments because young Tertiary shales dominate the sedimentary column, allowing a single seismic-velocity-to-pore-transform to be used. However, in unconventional reservoirs, changes in lithology occur over vertical depths that cannot be resolved using seismic velocities obtained by kinematic analysis, since these velocities have poor vertical resolution.

Compared to the vertical resolution of seismic velocities derived using seismic velocity analysis methods such as normal move-out (NMO) analysis and kinematic inversion, inversion of reflection amplitudes yields higher vertical resolution and greater sensitivity to reservoir properties. Accordingly, techniques for determining formation pore pressures using seismic reflection amplitude inversion are described below.

SUMMARY

Embodiments of the present disclosure can include a method for predicting pore pressure based on seismic data that includes obtaining seismic inversion data based in part on seismic data collected from a formation. The seismic inversion data can include seismic impedance data calculating a pore-pressure transform. In some examples, the pore-pressure transform includes parameters derived using measured pore pressure data, upscaled sonic logs, and density logs. The pore-pressure transform can include an objective function to reduce unphysical variations in predicted pore pressure corresponding to depth. In some embodiments, the method can include adjusting the pore-pressure transform for sampling bias caused by pore pressure measurements being restricted to a plurality of lithologies by accounting for a difference between upscaled seismic velocities and average sonic velocities within each of the lithologies. The method can also include generating pore pressure prediction values based on the pore-pressure transform for the lithologies and the seismic inversion data. Additionally, the method can include modifying a seismic model based on the generated pore pressure prediction values.

In some examples, the seismic impedance data can include P-impedance values and S-impedance values. In some embodiments, the seismic impedance data can include P-impedance values and a set of values calculated based on a relationship between a P-velocity value, an S-velocity value, a P-impedance value, and an S-impedance value. In some examples, the seismic impedance data can include a set of impedance values calculated based on P-impedance values and one or more S-impedance values, or at least one squared S-impedance value.

In some embodiments, generating the pore pressure prediction values can include calculating the sampling bias in the pore pressure measurements based on pressure measurements in a subset of the lithologies. In some examples, the objective function can include a term that is configured to produce a piecewise smooth pore-pressure prediction. In some embodiments, the objective function can be configured to produce the piecewise smooth pore-pressure prediction by detecting and penalizing predicted pore pressures having second derivatives that exceed a threshold with respect to a depth value in the formation.

In some examples, the method can include generating the seismic model and the seismic model can be a three-dimensional representation of the pore pressure values. The three-dimensional representation can be stored on a local storage device or transmitted to a remote storage device. In some embodiments, the method can include modifying a resource extraction technique based on the three-dimensional representation of the pore pressure values. In some examples, the seismic inversion data comprises pre-stack seismic inversion data.

In some embodiments, a system for predicting pore pressure based on seismic data can include a processor to execute computer-readable instructions that, in response to execution of the computer-readable instructions, cause the processor to perform operations including obtaining seismic inversion data based in part on seismic data collected from a formation. The seismic inversion data can include seismic impedance data calculating a pore-pressure transform. In some examples, the pore-pressure transform includes parameters derived using measured pore pressure data, upscaled sonic logs, and density logs. The pore-pressure transform can include an objective function to reduce unphysical variations in predicted pore pressure corresponding to depth. In some embodiments, the operations can include adjusting the pore-pressure transform for sampling bias caused by pore pressure measurements being restricted to a plurality of lithologies by accounting for a difference between upscaled seismic velocities and average sonic velocities within each of the lithologies. The operations can also include generating pore pressure prediction values based on the pore-pressure transform for the lithologies and the seismic inversion data. Additionally, the operations can include modifying a seismic model based on the generated pore pressure prediction values.

In some embodiments, a non-transitory computer-readable medium for predicting pore pressure based on seismic data can include a plurality of computer-readable instructions that, in response to execution of the computer-readable instructions by a processor, cause the processor to perform operations including obtaining seismic inversion data based in part on seismic data collected from a formation. The seismic inversion data can include seismic impedance data calculating a pore-pressure transform. In some examples, the pore-pressure transform includes parameters derived using measured pore pressure data, upscaled sonic logs, and density logs. The pore-pressure transform can include an objective function to reduce unphysical variations in predicted pore pressure corresponding to depth. In some embodiments, the operations can include adjusting the pore-pressure transform for sampling bias caused by pore pressure measurements being restricted to a plurality of lithologies by accounting for a difference between upscaled seismic velocities and average sonic velocities within each of the lithologies. The operations can also include generating pore pressure prediction values based on the pore-pressure transform for the lithologies and the seismic inversion data. Additionally, the operations can include modifying a seismic model based on the generated pore pressure prediction values.

Thus, the computing systems and methods disclosed herein are more effective methods for processing collected seismic data that may, for example, correspond to a surface and a subsurface region. These computing systems and methods increase data processing effectiveness, efficiency, and accuracy. Such methods and computing systems may complement or replace conventional methods for processing collected seismic data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the embodiments herein. However, it will be apparent to one of ordinary skill in the art that the described techniques may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the embodiments herein. The first object and the second object are both objects, respectively, but they are not to be considered the same object.

The terminology used in the description of the techniques herein is for the purpose of describing particular embodiments only and is not intended to be limiting. As used in the description of the techniques herein and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
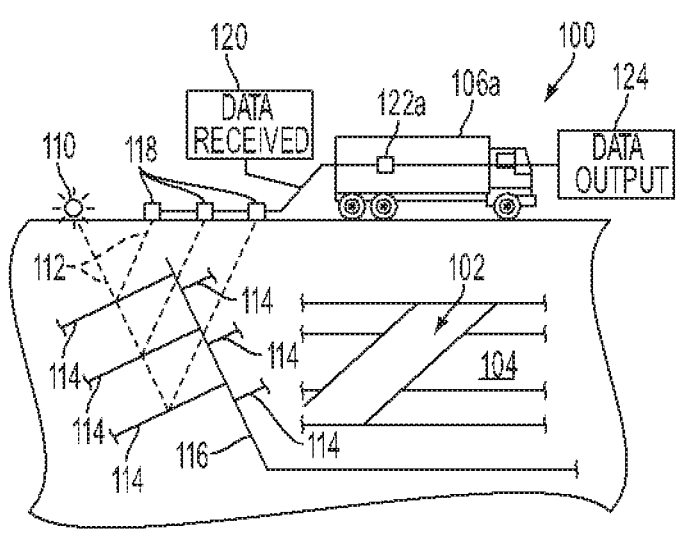
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

Figure 1B:
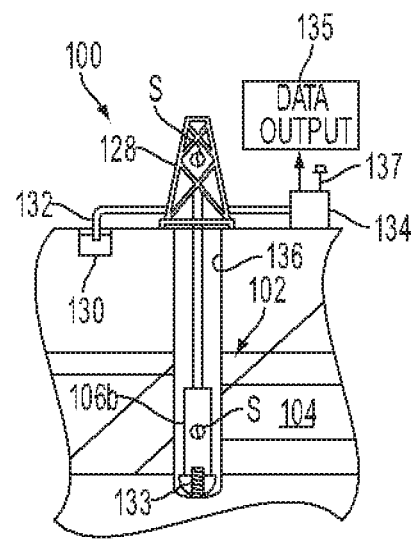

FIG. 1B illustrates a drilling operation being performed by drilling tools 106*b* suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106*b* may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
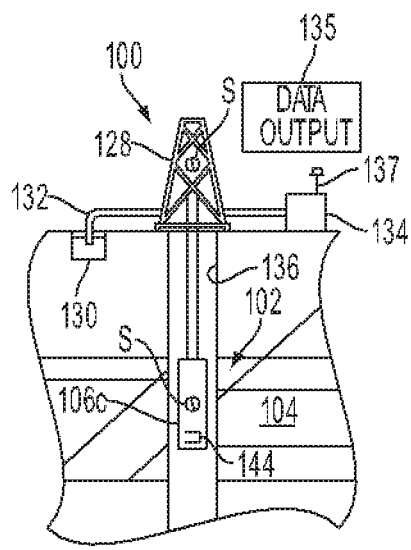

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122*a* of a seismic truck 106*a* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

Figure 1D:
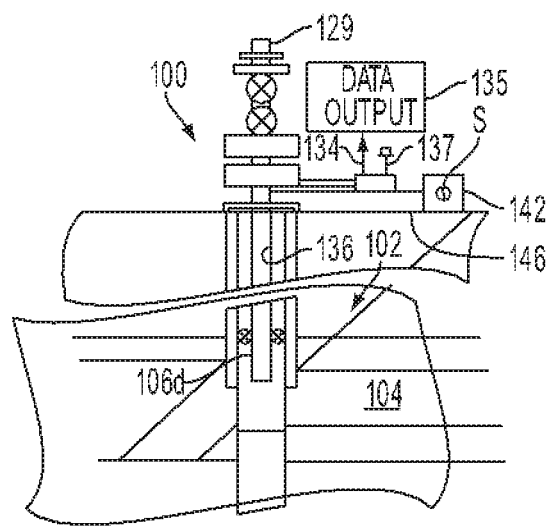

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
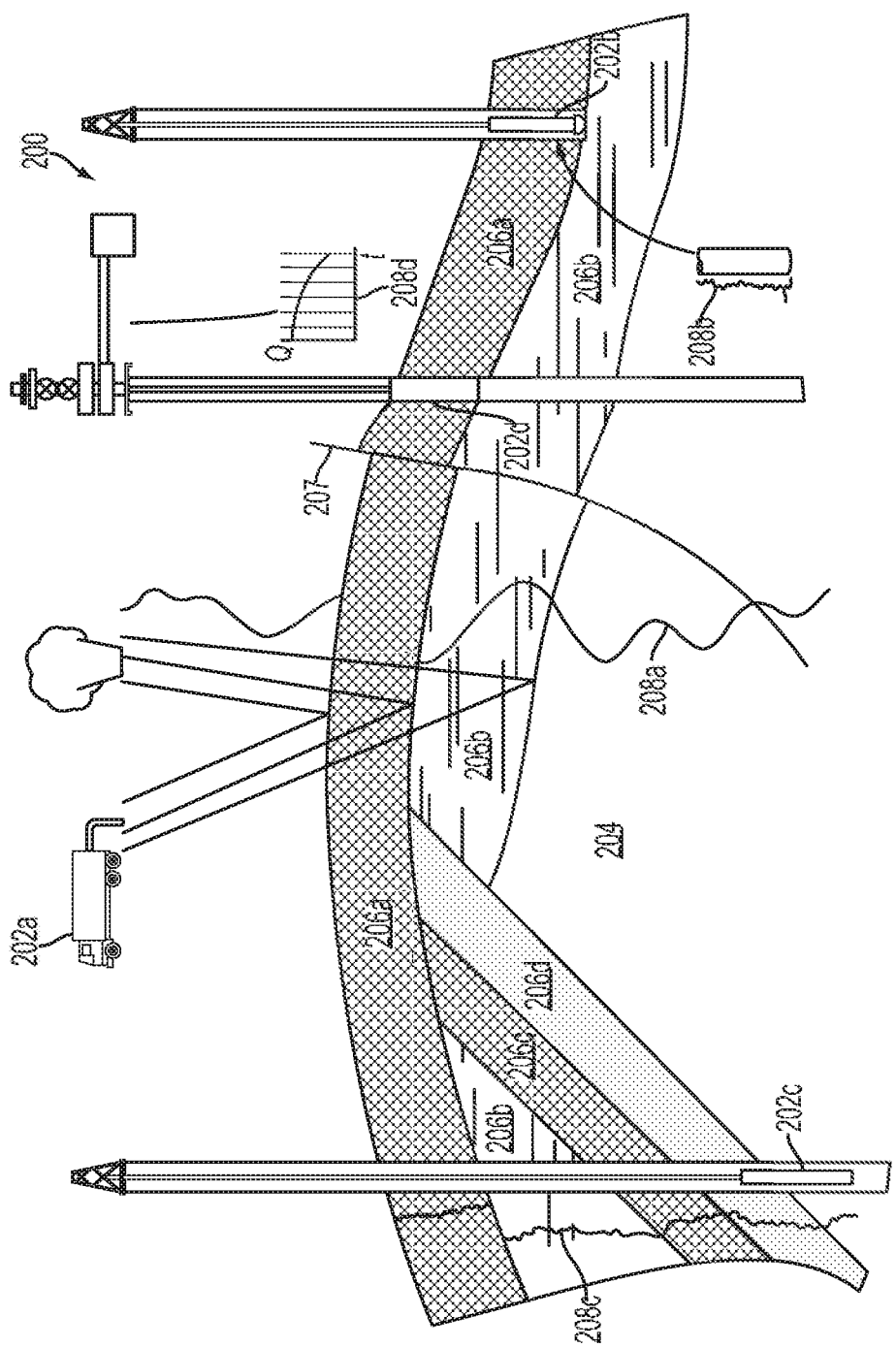

FIG. 2 illustrates a schematic view, partially in cross section of oilfield 200 having data acquisition tools 202a, 202b, 202c, and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208.2 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
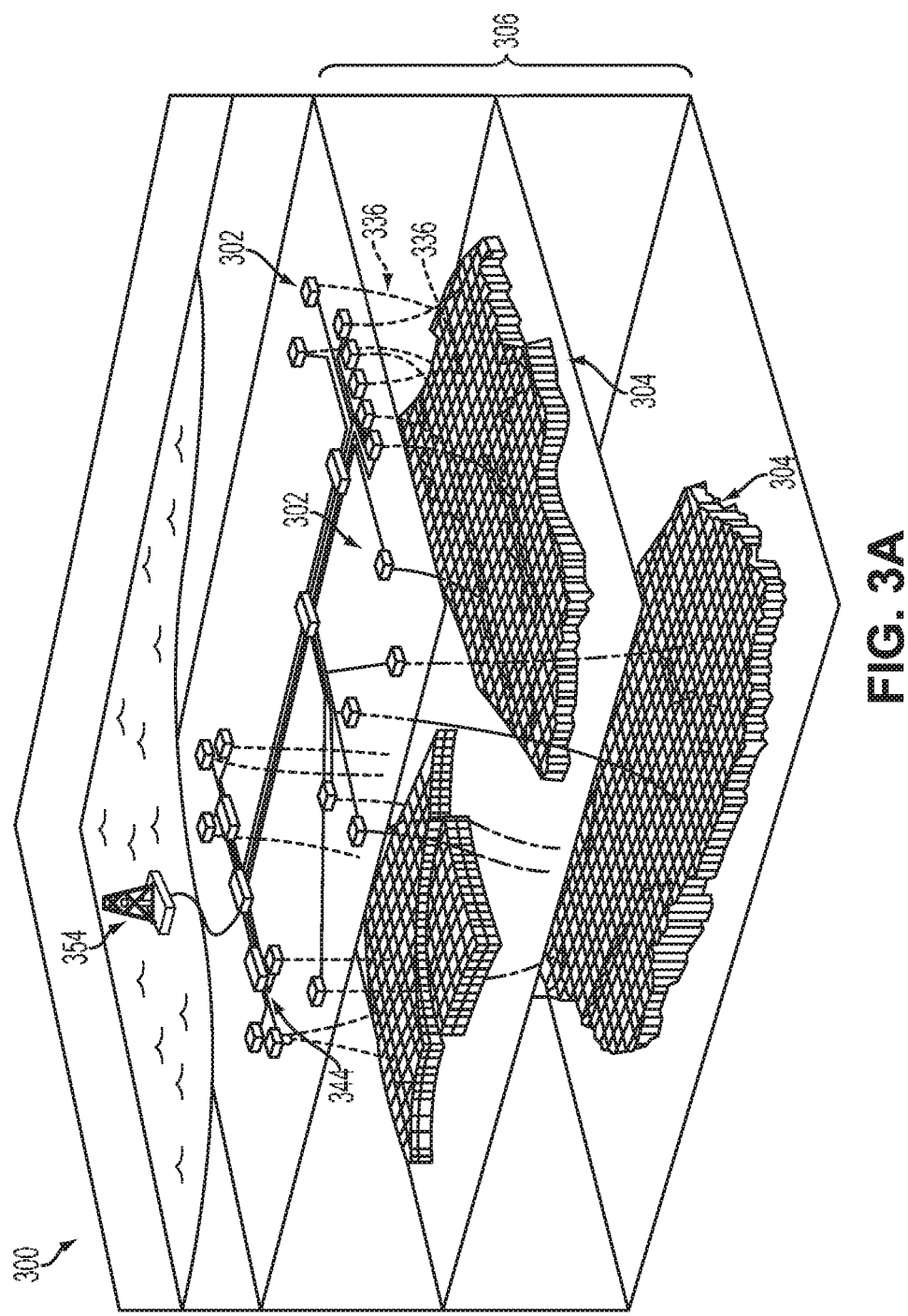

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
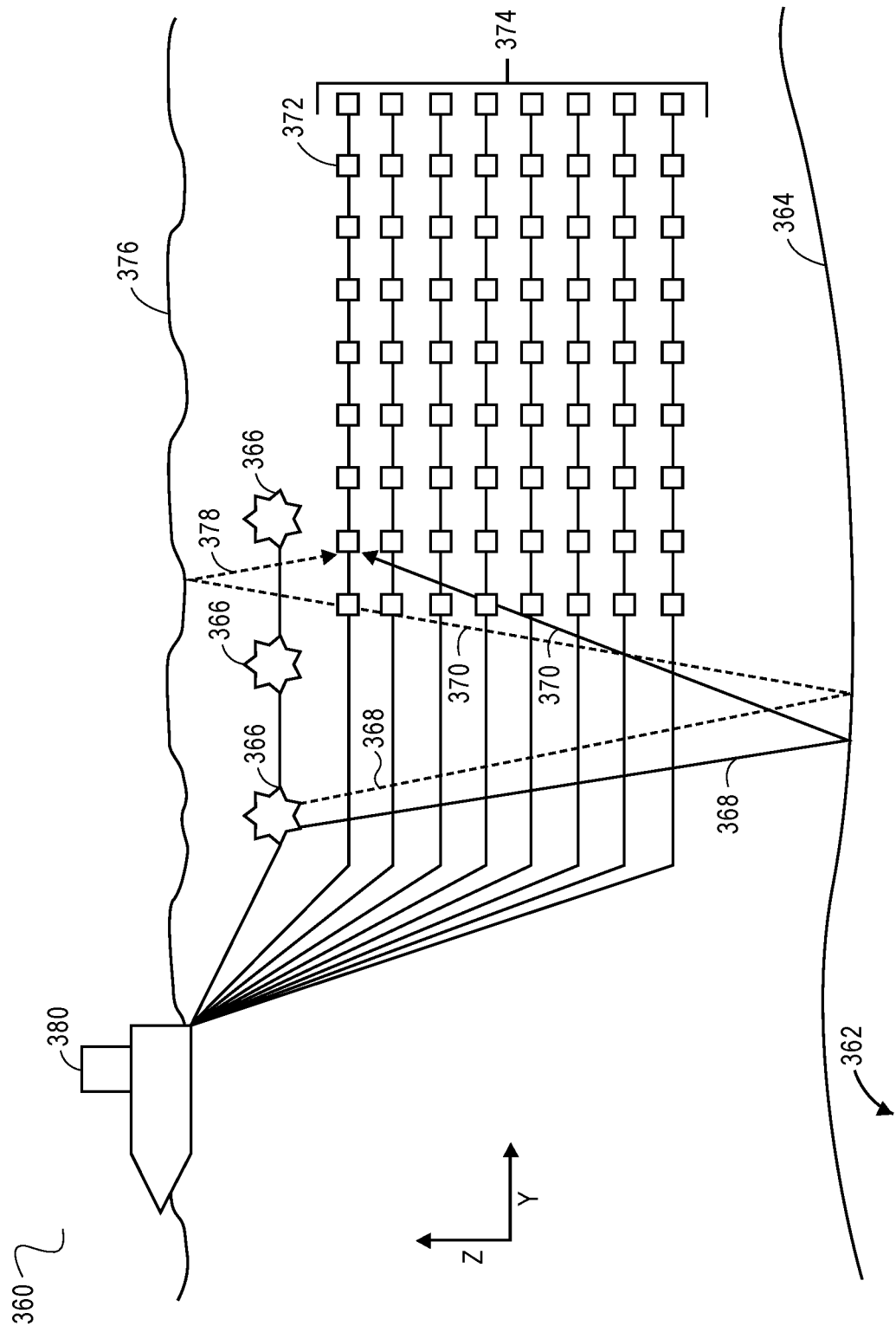

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In some systems, pre-drill estimates of formation pore pressures can be obtained from compressional sonic logs by using offset well data to determine a velocity-to-pore-pressure transform, and then applying the velocity-to-pore pressure transform to seismic velocities at a proposed well location to predict subsurface pore pressure and evaluate risk before drilling begins. In some examples, the formation pore pressures can also be obtained from compressional sonic logs from wellbores. Velocity-based-pore pressure-prediction is generally accurate in environments like the Gulf of Mexico, where young Tertiary shales dominate the sedimentary column. The physical principle is that whereas compressive overburden stress acts to compact the rock, thereby increasing the velocity of elastic waves propagating through the rock, pore pressure (exerted by the fluid contained in the rock) acts to reduce the amount of compaction, thus leading to a reduction in elastic wave velocity. Measurable effects of stress change, including compaction and variation in elastic wave velocities, thus depend on the effective stress tensor ($\sigma_{ij}$), equal to the difference between the total stress tensor ($S_{ij}$) and pore pressure (p):

$$\sigma_{ij} = S_{ij} - p\alpha_{ij}. \tag{1}$$

where $\alpha_{ij}$ is a second-rank poroelastic tensor. To estimate pore pressure using velocity-based techniques, the tensorial nature of stress is often neglected, and elastic wave velocity is assumed to be a function only of vertical effective stress:

$$\sigma_v = S_v - \alpha p \tag{2}$$

In some examples, the vertical overburden stress ($S_v$) at any depth z is determined by the combined weight of the overlying rock matrix plus any fluids contained in the pore spaces, and can be obtained by integrating the measured vertical variation in rock density ($\rho$):

$$S_v(z) = g\int_0^z \rho(z)dz \tag{3}$$

where g denotes the gravitational constant. According to Terzaghi's principle, velocity-based pore pressure methods attempt to estimate pore pressure from formation velocity based on empirical estimates of vertical effective stress ($\sigma_v$).

Unfortunately, there are a number of complications associated with velocity-based pore pressure estimation. Firstly, variations in acoustic velocity are not caused solely by pore pressure, but also by changes in rock lithology (composition and mineralogy). Secondly, in unconventional reservoirs, changes in lithology occur very quickly, over vertical depth intervals too small to be resolved by seismic velocities obtained using seismic velocity analysis methods such as normal move-out (NMO) analysis or kinematic analysis, since seismic velocities have comparatively poor vertical resolution. Thirdly, owing to their limited vertical resolution, seismic velocities represent an average of actual velocity variations.

Compared to the low vertical resolution of seismic velocities, inversion of reflection amplitudes yields greater vertical resolution and increased sensitivity to reservoir properties. Accordingly, embodiments of the present disclosure provide a technique for estimating formation pore pressure using seismic reflection amplitude inversion, according to an embodiment. In some examples, the techniques herein can include calibrating a seismic-to-pore-pressure transform using well data. The techniques can also include using P-impedance and S-impedance from inversion of pre-stack seismic data to compensate for variations in rock lithology. For example, the techniques herein can detect variations in rock lithology based on P-impedance rather than seismic velocity. Further, the techniques can include directly calibrating seismic impedances to pore pressure, which avoids errors due to differences between higher resolution sonic velocities and density values from well logs and lower resolution seismic impedances.

Figure 4:
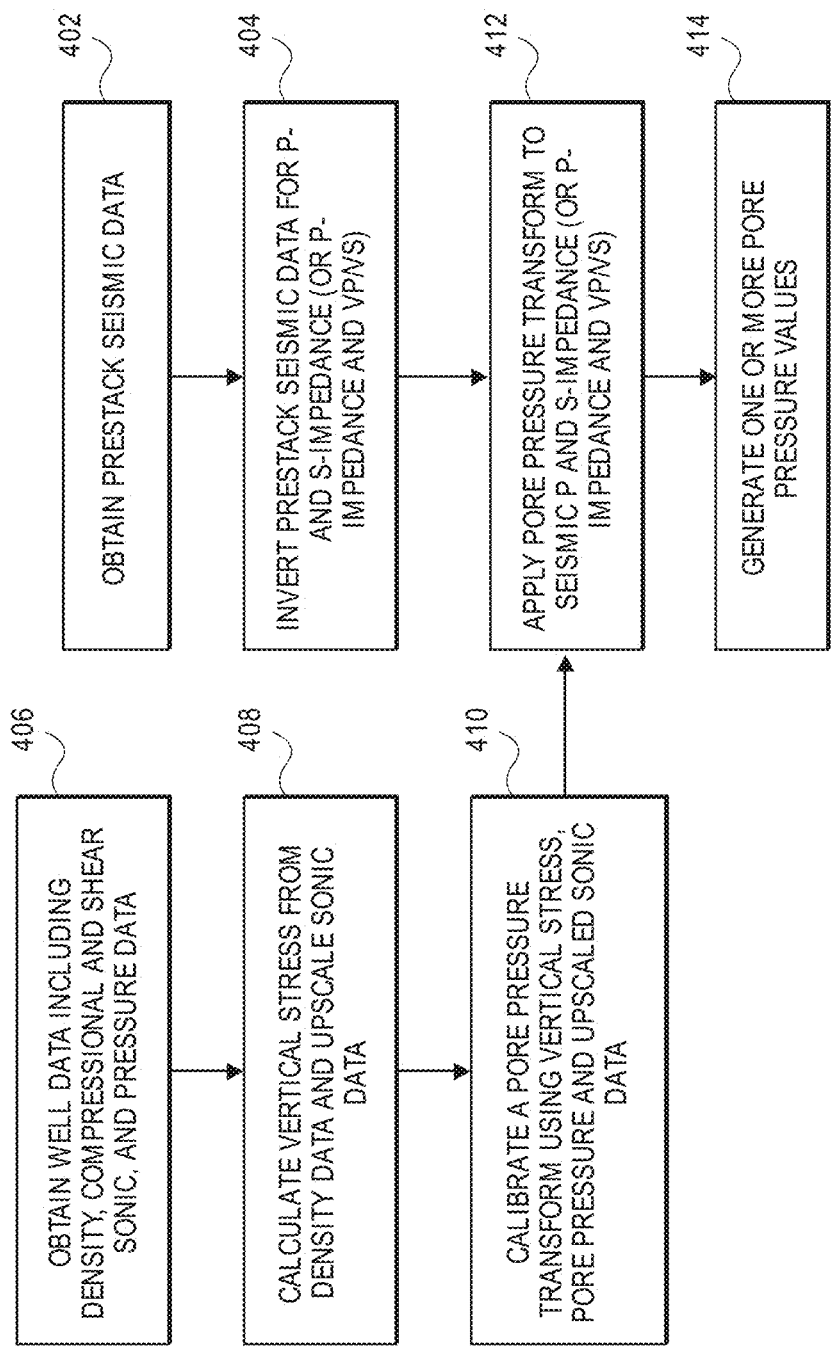
FIG. 4 is an example method of a process flow diagram for determining a pore pressure of a geographic formation, according to an embodiment herein.

FIG. 4 illustrates an example process flow diagram for a method for predicting pore pressure, according to embodiments herein. The method 400 can be implemented with any suitable computing device, such as the computing system 1601A of FIG. 16.

At block 402, the method 400 can include obtaining pre-stack seismic data collected from a formation. The pre-stack seismic data can be obtained from any suitable technique. For example, the pre-stack seismic data can be obtained using depth migration before a stacking sequence occurs.

At block 404, the method 400 can include inverting the pre-stack seismic data to generate P-impedance values and/or S-impedance values. In some embodiments, the method 400 can include inverting pre-stack seismic data to generate P-impedance values. Inverting the pre-stack seismic data can also include obtaining P-velocity values divided by S-velocity values. In some embodiments, the pre-stack seismic inversion data can include seismic impedance data, among other data. In some examples, the pre-stack seismic inversion data can be obtained using any suitable technique, such as a simultaneous inversion, among others. In some embodiments, simultaneous inversion can include detecting input, such as multiple offset or angle seismic sub-stacks and associated wavelets. The simultaneous inversion technique can include generating P-impedance values, S-impedance values, and density values as output.

At block 406, the method 400 can include obtaining well data that can include density, compressional, shear, sonic, and pressure data, among others. In some embodiments, the well data can be obtained from any suitable set of sensors, logging equipment, and the like. The well data can include borehole directional surveys or wireline logs (e.g., compressional sonic data logs, shear sonic data logs, density data logs, gamma-ray data logs, neutron data logs, and caliper data logs, among others). In some examples, the block 406 can be performed in parallel with block 402. At block 408, the method 400 can include calculating a vertical stress from the density data and upscale sonic data. In some examples, the block 408 can be performed in parallel with block 404. Techniques for calculating vertical stress are described in greater detail below in relation to FIG. 15.

At block 410, the method 400 can include calibrating a pore-pressure transform. In some examples, the pore-pressure transform can include parameters, such as P-impedance and S-impedance, derived using measured pore pressure data, upscaled sonic logs, and density logs. The upscaled sonic logs can be generated based on Backus averaging, or any other suitable technique, applied to sonic log data. In some embodiments, the pore-pressure transform can be adjusted for sampling bias due to pore pressure measurements being restricted to lithologies by accounting for a difference between upscaled seismic velocities and average sonic velocities within each of the lithologies. In some examples, the method 400 can include calculating a sampling bias in the pore pressure measurements based on pressure measurements in a subset of the lithologies. The pore-pressure transform can include, in some examples, an objective function to minimize unphysical variations in predicted pore pressure corresponding to depth. The pore pressure in the formation can be predicted using the pore-pressure transform and the pre-stack seismic inversion data, among others.

At block 412, the method 400 can include applying the pore-pressure transform to the seismic P-impedance and S-impedance values. In some examples, the method 400 can include applying the pore pressure transform to P-impedance values and a combination of P-velocity and S-velocity values. In some embodiments, the P-velocity values are divided by S-velocity values, and the results can be applied to the pore-pressure transform to detect a pore pressure in a lithology of a reservoir.

At block 414, the method 400 can include generating one or more pore pressure values, via the pore-pressure transform, for each of the lithologies. In some embodiments, the method 400 can include generating a three-dimensional representation of a seismic model of the pore pressure values based on the pore pressure values. The three-dimensional representation can be stored on a local storage device or transmitted to a remote storage device. In some examples, the method 400 can include modifying a resource extraction technique based on the three-dimensional representation of the one or more pore pressure values. For example, the method 400 can include modifying a well location, a drilling technique, a well trajectory, and the like. In some embodiments, a seismic model can be modified based on the generated pore pressure values to reflect the estimated pore pressure in a geologic reservoir. For example, the method 400 can include generating a seismic image based on the obtained pre-stack seismic data. The seismic image can be included in a seismic model that is modified to reflect the predicted pore pressure values. The seismic image or model can enable the evaluation of the subsurface three-dimensional geologic formation under consideration. In some examples, pore pressure values of an existing seismic model can be updated based on the generated pore pressure values.

It is to be understood that the method 400 can include additional or fewer blocks. Additionally, the blocks of method 400 can be executed in any suitable order.

Figure 5:
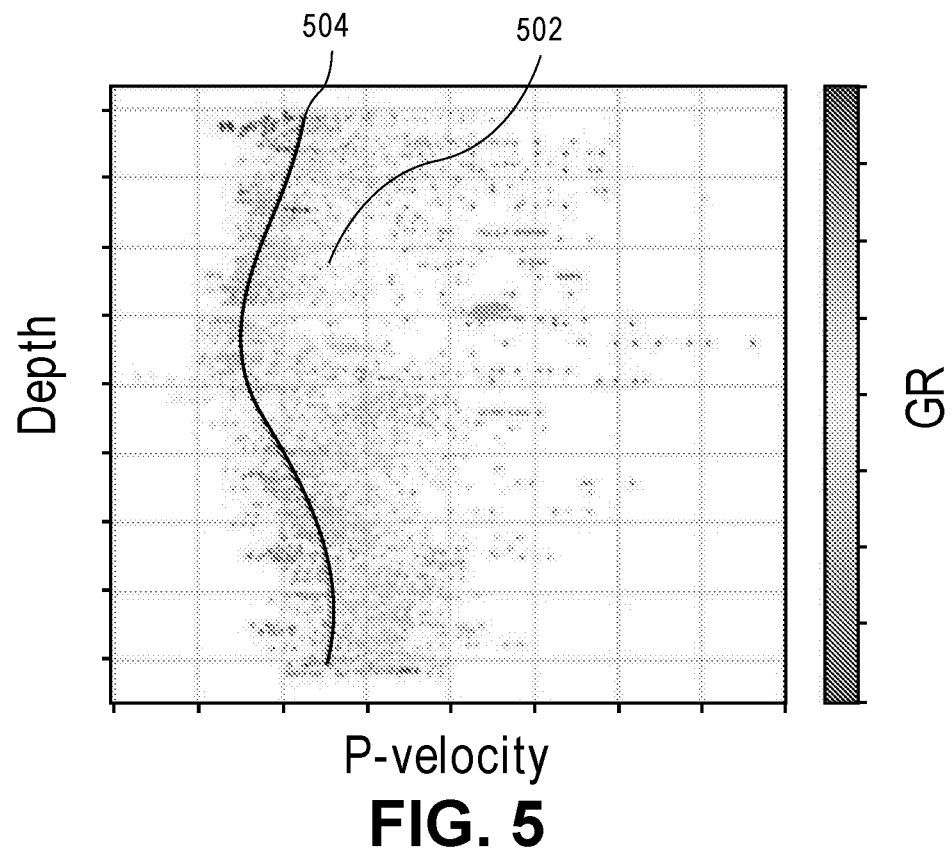
FIG. 5 illustrates example compressional sonic velocities in a formation from a vertical well in an onshore geographic formation, according to an embodiment.

FIG. 5 illustrates example compressional sonic velocities in a geologic formation from a vertical well in an oil and gas basin. In some examples, compressional sonic velocity points are coded according to a GR (gamma ray) count 502. In some embodiments, a curved line 504 denotes the approximate average velocity values for points with a high gamma ray count.

In some examples, since clays contain a relatively high concentration of naturally radioactive elements, clays are generally associated with high gamma-ray readings. Moreover, clay-rich sediments typically exhibit a stronger variation in sonic velocity with effective stress than clay-poor sediments. Accordingly, in conventional velocity-based pore-pressure prediction, a gamma ray threshold is applied such that sonic velocities above a specified GR threshold are used to predict pore pressure.

Figure 6:
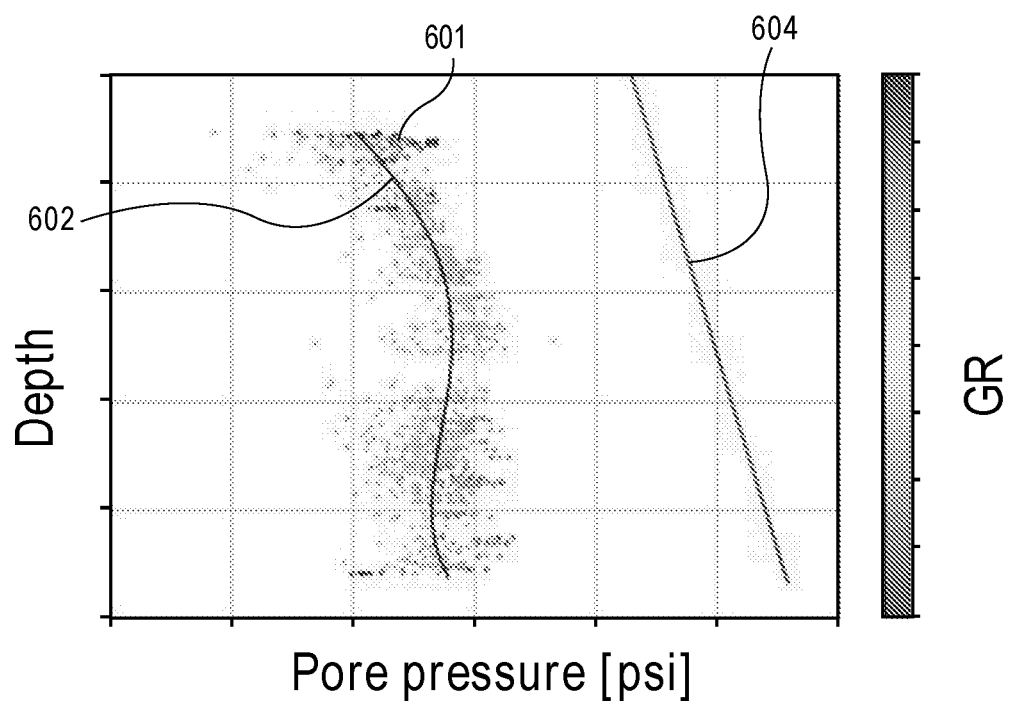
FIG. 6 illustrates example pore pressure predicted from FIG. 5 according to an embodiment herein.

FIG. 6 illustrates an example pore-pressure prediction obtained from FIG. 5, according to embodiments herein. In some examples, the pore pressure 601 is predicted using sonic velocities. For example, techniques herein can use sonic velocities with gamma ray (GR) greater than 120, or any other suitable value, and a polynomial fit line 602. In some embodiments, the polynomial fit line 602 can be generated with any suitable mathematical technique. In some examples, a curved line or a separate line 604 denotes vertical stress.

Figure 7:
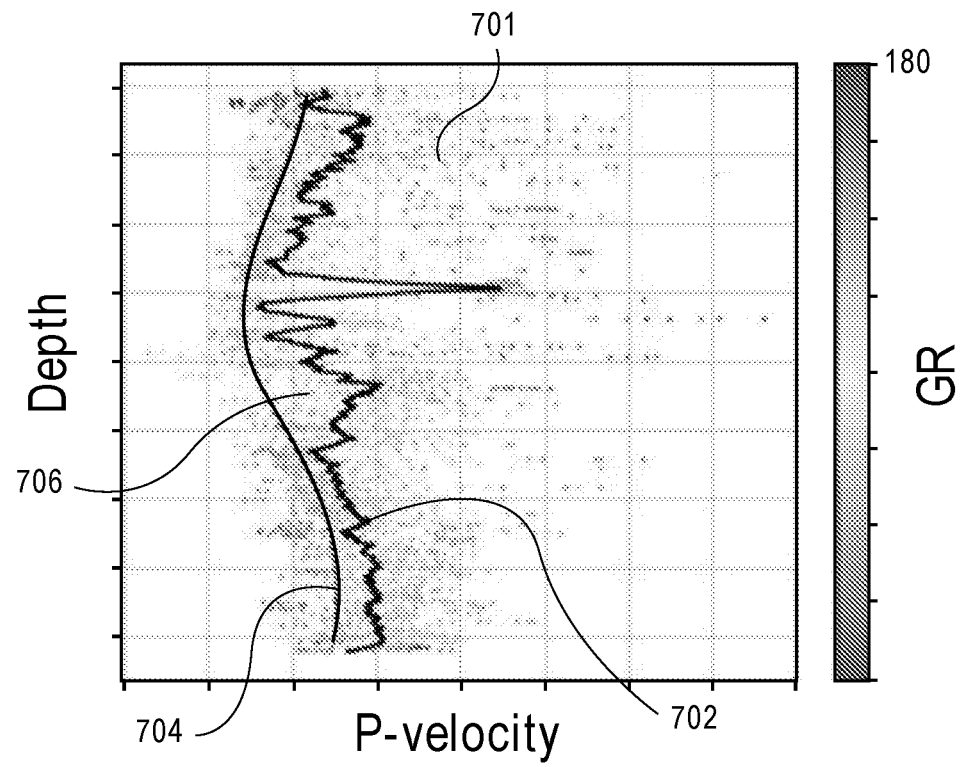
FIG. 7 illustrates example sonic P-velocities in a geographic formation from a vertical well in an oil and gas basin, according to an embodiment.

Regarding FIG. 7, in some examples, P-velocity points 701 are coded by GR (gamma ray) count. In some embodiments, upscaled velocities can be obtained by any suitable averaging technique, such as a Backus averaging techniques illustrated as a black line 702. Backus averaging can include any technique that averages property values or characteristic values of a stack of thin horizontal layers of a reservoir. In some embodiments, the results from Backus averaging can be expressed in terms in which the individual layers are assumed to be transversely isotropic with an axis of rotational symmetry perpendicular to the layers. For example, Backus averaging can be implemented with the following Equations 4-9, in which upper case $C_{11}$, $C_{12}$, $C_{33}$, $C_{55}$, and $C_{66}$ are the upscaled elastic stiffness coefficients, and lower case $c_{11}$, $c_{12}$, $c_{33}$, $c_{55}$, and $c_{66}$ are the elastic stiffness coefficients of the individual layers. The angular brackets $<>$ can denote a volume weighted average.

$$C_{11} = c_{11} + c_{33}^{-1} c_{13}^{2} c_{33}^{-1\ -1} c_{33}^{-1} c_{13}^{2} \quad (4)$$

$$C_{33} = c_{33}^{-1\ -1} \quad (5)$$

$$C_{12} = C_{11}\ c_{11} + c_{12} \quad (6)$$

$$C_{13} = c_{33}^{-1} c_{13}\ c_{33}^{-1\ -1} \quad (7)$$

$$C_{55} = c_{55}^{-1\ -1} \quad (8)$$

$$C_{66} = c_{66} \quad (9)$$

In some examples, a lighter black line 704 denotes the approximate average obtained using points with a GR count greater than a predetermined value, such as 120, among others. In some examples, a gap 706 between the two lines 702 and 704 can illustrate a sampling bias associated with upscaled seismic velocities due to pore pressure being measuring in shale lithology.

In some embodiments, since seismic velocities have comparatively low vertical resolution, sonic velocities correspond to a depth-dependent average of the velocities shown in FIG. 7. In some examples, such sonic velocities can generally be higher than the curved line 704 in FIG. 7, since the sonic velocities correspond to an average of both high clay (low velocity) and low clay (high velocity) points. This is illustrated in FIG. 7, which compares the Backus-averaged sonic velocities 702 to the curve 704, obtained by averaging only velocities greater than a predetermined GR value. Similarly, upscaled S-velocities obtained using averaging can also be higher than S-wave velocities of sediments with high clay content (high GR), as shown in FIG. 8 and discussed in greater detail below.

Figure 8:
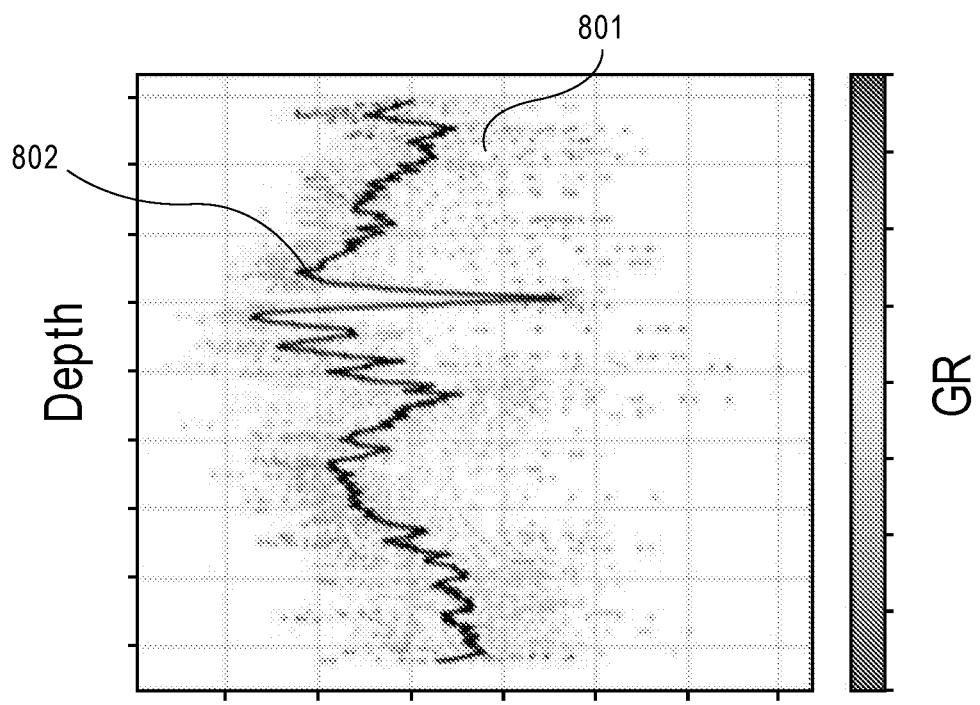
FIG. 8 illustrates example sonic S-velocities in a geographic formation from a vertical well in an onshore oil and gas basin, according to an embodiment.

Regarding FIG. 8, in some examples, S-velocity points 801, representing measured S-velocities, are color-coded by GR (gamma ray) count, whereas the black line 802 represents the result obtained by applying a suitable averaging technique. In some embodiments, the black line 802 can be obtained by applying Backus averaging. As indicated by the scale, points to the right have lower GR whereas points to the left have higher GR. Conventional sonic-based pore pressure prediction uses only higher GR points. Thus seismic, which is approximated by the upscaled curve or black line 802 provides a different pore pressure prediction than if this shift is not accounted for.

As illustrated in FIGS. 7 and 8, in some examples, upscaled velocities 702 and 802 (curved lines) can be significantly higher than sonic velocities corresponding to high clay content sediments (high GR), since vertical averaging also includes high velocity (low GR points) corresponding to layers with higher carbonate content. In some examples, the seismic-to-pore pressure-transform may be recalibrated using the estimates of pore pressure made at available offset wells together with upscaled P-impedance values 902 of FIG. 9, so than an accurate pore-pressure prediction can be made from seismic P-impedance. In some embodiments, shear impedance can also be used in the proposed transform, to help compensate for the influence of variable lithology and mineralogy on upscaled P-impedance 902. Notwithstanding, recalibrating a velocity-to-pore-pressure transform using upscaled velocities can also improve conventional seismic pore-pressure predictions that use only P-wave velocities.

Since seismic velocities obtained by kinematic analysis have poor vertical resolution, results obtained by inverting pre-stack reflection amplitudes can be used for pore-pressure prediction in techniques herein, because these yield higher vertical resolution. Amplitude variation with offset (AVO) of seismic waves reflected from an interface between two geological layers can be used to determine P-impedance, $I_P = \rho V_P$, and S-impedance, $I_S = \rho V_S$, where $V_P$, $V_S$, and $\rho$ denote respectively P-velocity, S-velocity and density. In some embodiments, P-impedance and S-impedance are two -resolved parameters derivable from inversion of seismic P-wave AVO data.

Figure 9:
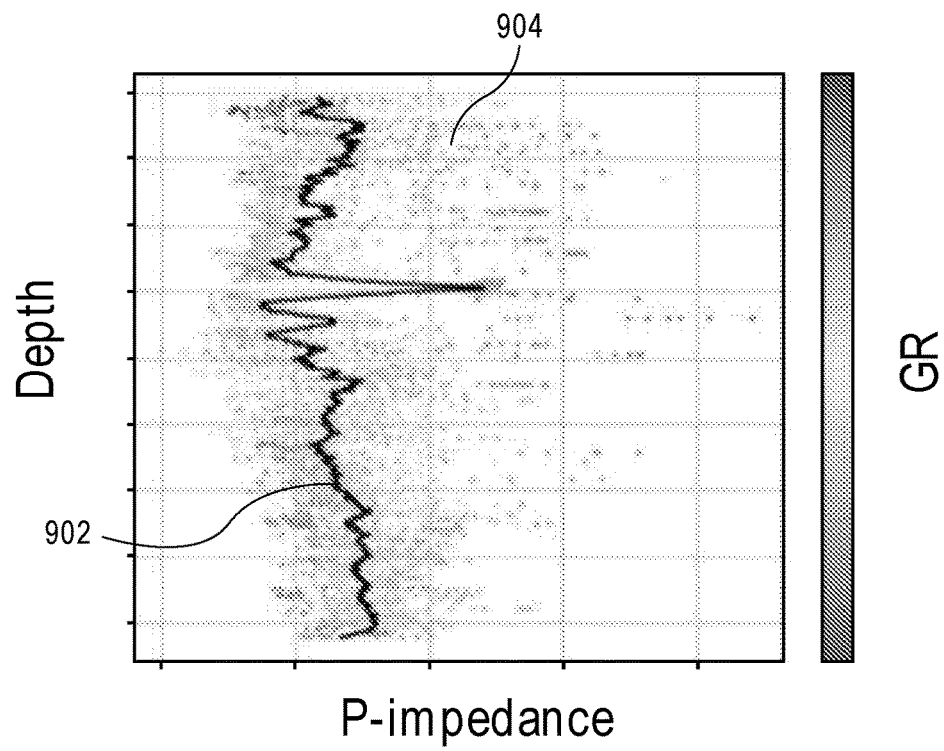
FIG. 9 illustrates example sonic P-impedance in a geographic formation from a vertical well in the oil and gas basin, according to an embodiment.
Figure 10:
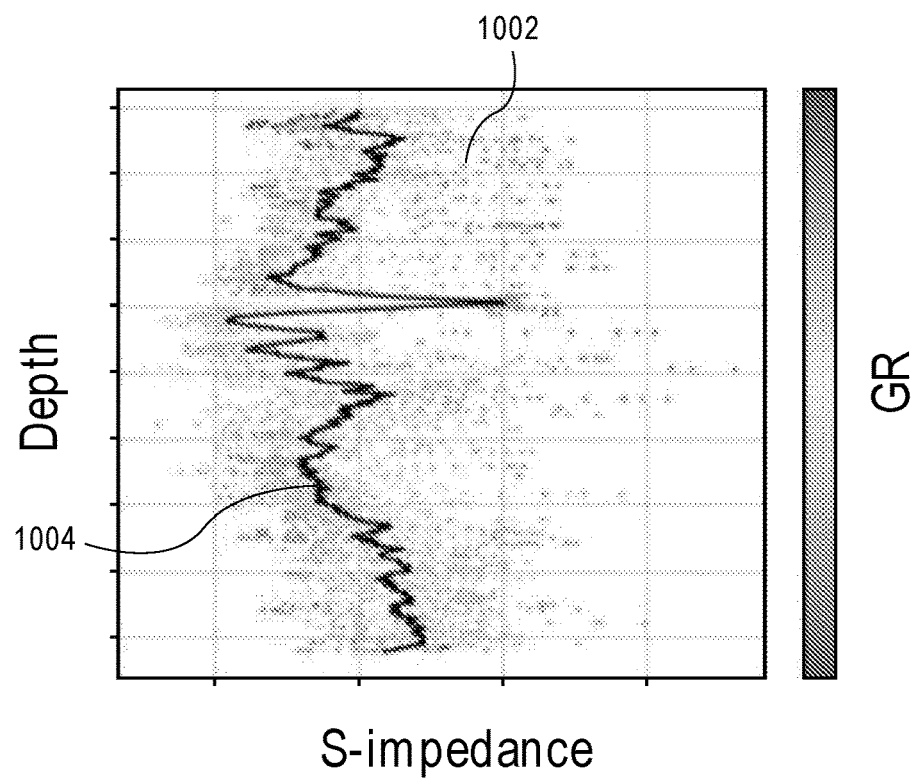
FIG. 10 illustrates example sonic S-impedance in a geologic formation from a vertical well in an oil and gas basin, according to an embodiment.

In some examples, both density and velocity decrease with increasing pore pressure. Accordingly, P-impedance can exhibit greater sensitivity to pore pressure than P-velocity alone, since the product of density and velocity is more sensitive than either quantity. In addition, S-impedance can be used in the proposed transform to help compensate for the effects of variable mineralogy in upscaled velocities. Examples of upscaled P-impedance and S-impedance are compared with log P-impedance and S-impedance in FIGS. 9 and 10, respectively. In some embodiments, FIG. 9 illustrates sonic P-impedance values 904 in a geologic formation from a vertical well in an oil and gas basin. In some embodiments, P-impedance values 904 are coded by GR (gamma ray) count. In some examples, upscaled P-impedance values 902 can be obtained by Backus averaging, or any other suitable technique, which is depicted by the line 902. In some embodiments, FIG. 10 illustrates sonic S-impedance values 1002 in a geologic formation from a vertical well in an oil and gas basin. In some embodiments, S-impedance values 1002 are coded by GR (gamma ray) count. In some examples, upscaled S-impedance values 1004 can be obtained by Backus averaging, or any other suitable technique, which is depicted by the line 1004.

Figure 11:
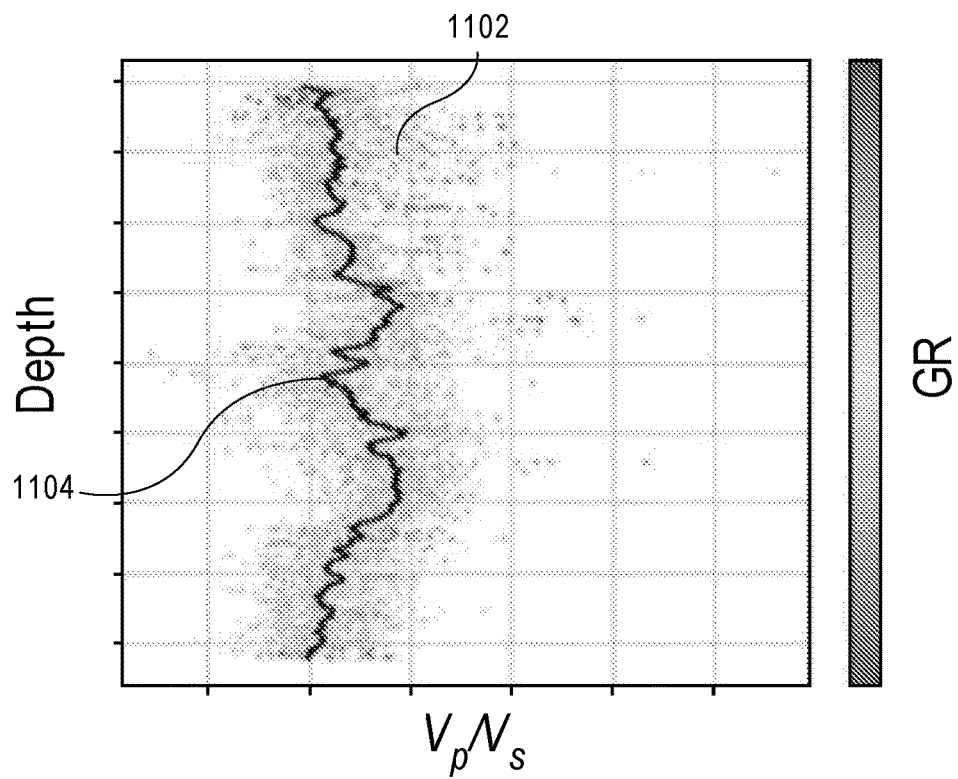
FIG. 11 illustrates example sonic $V_P/V_S$ values in a geologic formation from a vertical well in an oil and as basin, according to an embodiment.

In some examples, FIG. 11 illustrates sonic values calculated by dividing P-velocity $V_P$ by S-velocity $V_S$ values in a geologic formation from a vertical well in an oil and as basin. In some examples, Vp/Vs values or points 1102 can be coded by GR (gamma ray) count. In some examples, upscaled $V_P/V_S$ points 1102 can be obtained by Backus averaging, or any other suitable technique, which is depicted by the line 1104.

The transform may also be formulated in terms of P-impedance and $V_P/V_S$ as an alternative to using P-impedance and S-impedance, since $V_P/V_S = I_P/I_S$. Upscaled $V_P/V_S$ values 1104 can be compared with wireline log values $V_P/V_S$ 1102 in FIG. 11. In some embodiments, an alternative to using P-impedance and S-impedance values is to use $\lambda_\rho (= I_P^2 - 2I_S^2)$ and $\mu\rho (= I_S^2)$, since these quantities can be derived from P-impedance and S-impedance. Examples of upscaled $\lambda\rho$ and $\mu\rho$ are compared with log $\lambda\rho$ and $\mu\rho$ in FIGS. 12 and 13, respectively.

Figure 12:
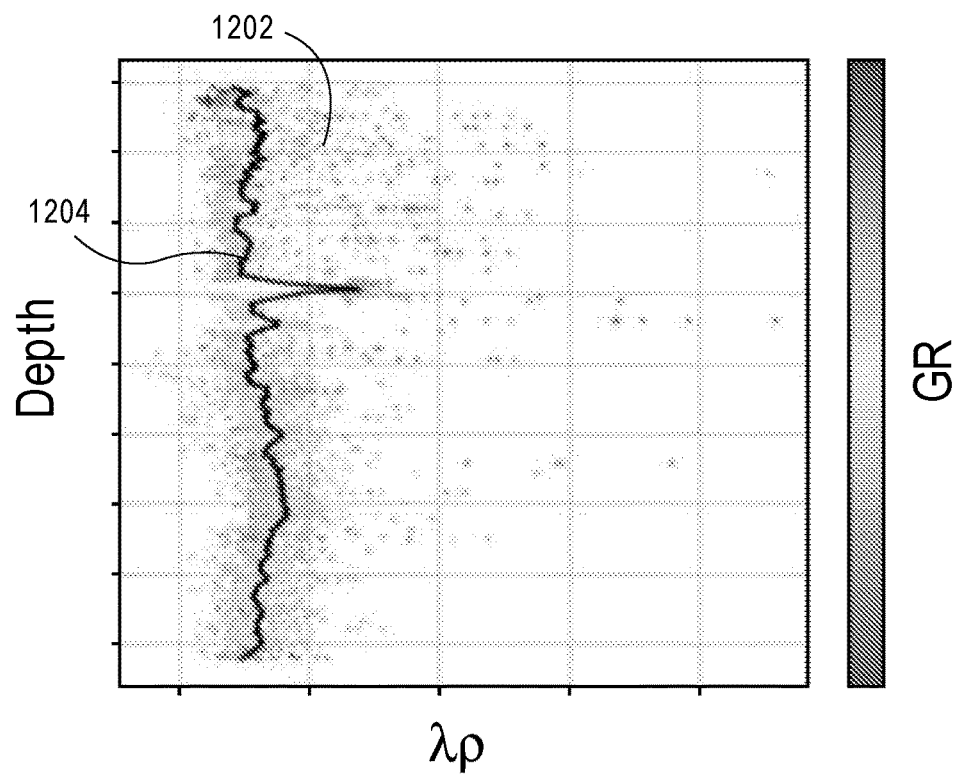
FIG. 12 illustrates example sonic $\lambda\rho$ values in a geologic formation from a vertical well in an oil and gas basin, according to an embodiment.

For example, FIG. 12 illustrates sonic $\lambda\rho$ values in a geologic formation from a vertical well in an oil and gas basin. In some examples, $\lambda\rho$ values 1202 are coded by GR (gamma ray) count. In some embodiments, upscaled $\lambda\rho$ values can be obtained by a Backus averaging technique, or any other suitable technique, which is depicted by line 1204.

Figure 13:
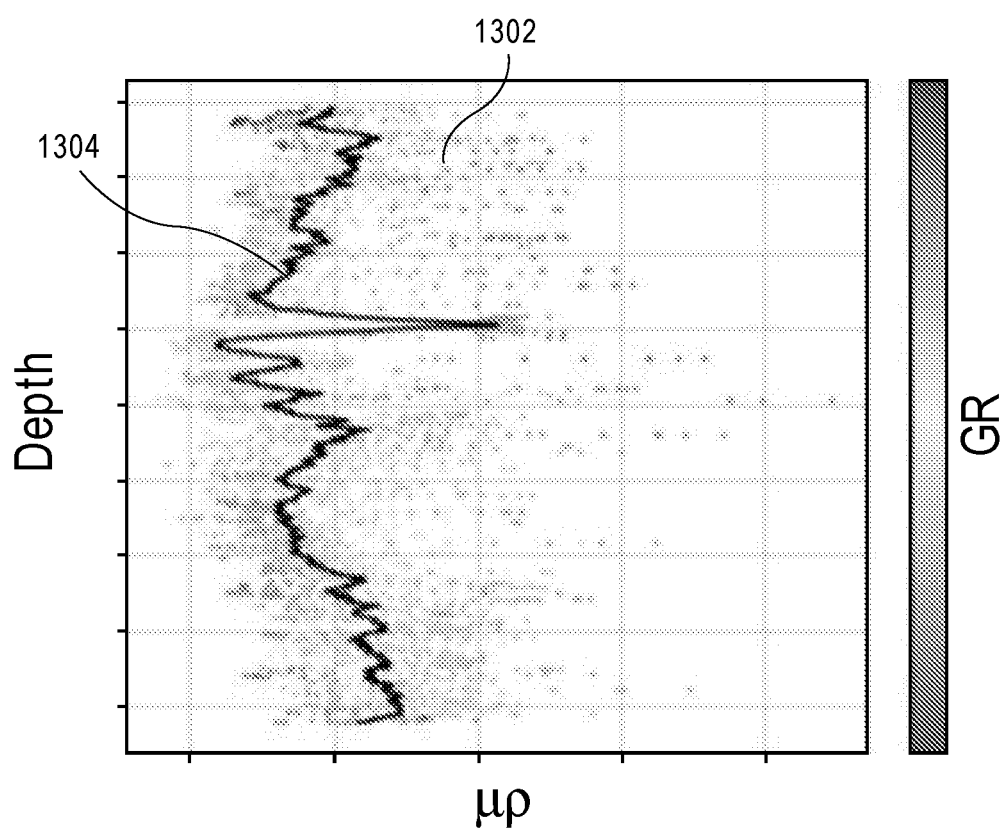
FIG. 13 illustrates example sonic $\mu\rho$ values in a geologic formation from a vertical well in an oil and gas basin, according to an embodiment.

FIG. 13 illustrates example sonic μρ values in a geologic formation from a vertical well in an oil and gas basin, according to an embodiment. In some examples, μρ values 1302 are coded by GR (gamma ray) count. In some embodiments, upscaled μρ values 1302 can be obtained by a Backus averaging technique, or any other suitable technique, which is depicted by line 1304.

In some embodiments, the pore pressure measurements used to calibrate a pore-pressure transform based on P-impedance and $V_P/V_S$ may be obtained in a restricted number of lithologies. For example, DFIT measurements in a Wolfcamp interval of the Permian Basin, among other geologic formations, may be available in shales, but not in tight carbonate layers embedded within the shale. As a result, optimization of a particular pore-pressure transform based on P-impedance and $V_P/V_S$, by minimizing the sum of squared differences between measured and predicted pore pressures, for example, may be employed to yield a good fit for shales, but may result in an incorrect prediction for carbonates. Thus, this technique may lead to spurious fluctuations in predicted pore pressure variation with depth. These fluctuations may not reflect physical reality, since equilibration of pore pressure between different layers occurs over geologic time scales, causing fluctuations in pore pressure with depth to be less than those due to lithology.

Figure 14:
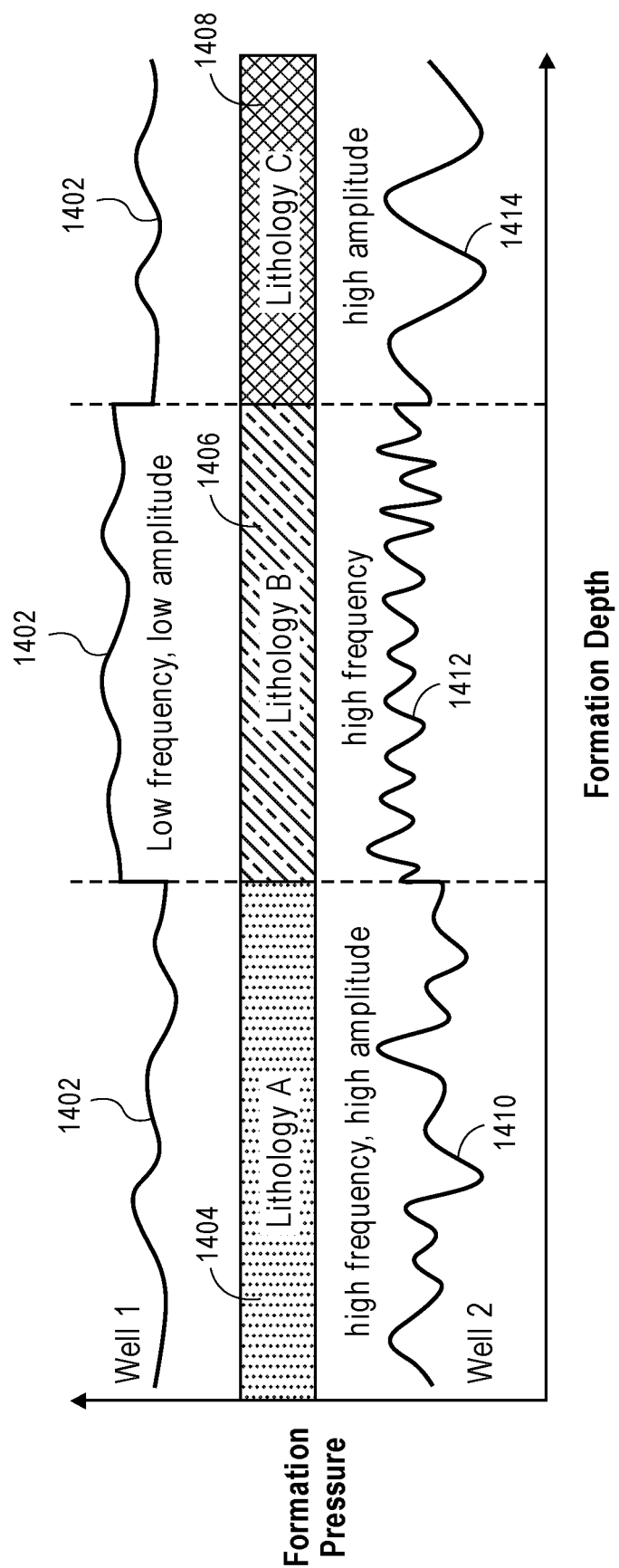
FIG. 14 illustrates an example piece-wise smoothing of formation pre-pressure regime, according to an embodiment.

As shown in FIG. 14, realistic pore-pressure predictions may reflect a "piece-wise smooth" pressure versus depth relationship. The pore pressure may have a relatively low frequency modulation having low amplitude fluctuations in a given lithologic unit, but potentially large or abrupt changes between the different lithologic units. As shown in FIG. 14, well 1 is piece-wise smooth (according to an example), while well 2 is not. For example, the formation pressure of well 1 is a constant low frequency and low amplitude curve 1402 through lithology A 1404, lithology B 1406, and lithology C 1408. However, the formation pressure 1410 of well 2 varies in terms of frequency and amplitude. For example, the formation pressure of well 2 is indicated as a high frequency, high amplitude line 1410 in lithology A 1404, a high frequency line 1412 in lithology B 1406, and a high amplitude line 1414 in lithology C 1408.

As described below in relation to FIG. 15, to reflect realistic pore pressure versus depth relationships, a second term in the objective function may be added to minimize fluctuations and, e.g., provide a piece-wise smooth result. In an embodiment, this can be achieved by penalizing solutions whose second derivative with respect to depth is large, for example. In other embodiments, other ways of achieving such piece-wise smoothing may be employed.

Figure 15:
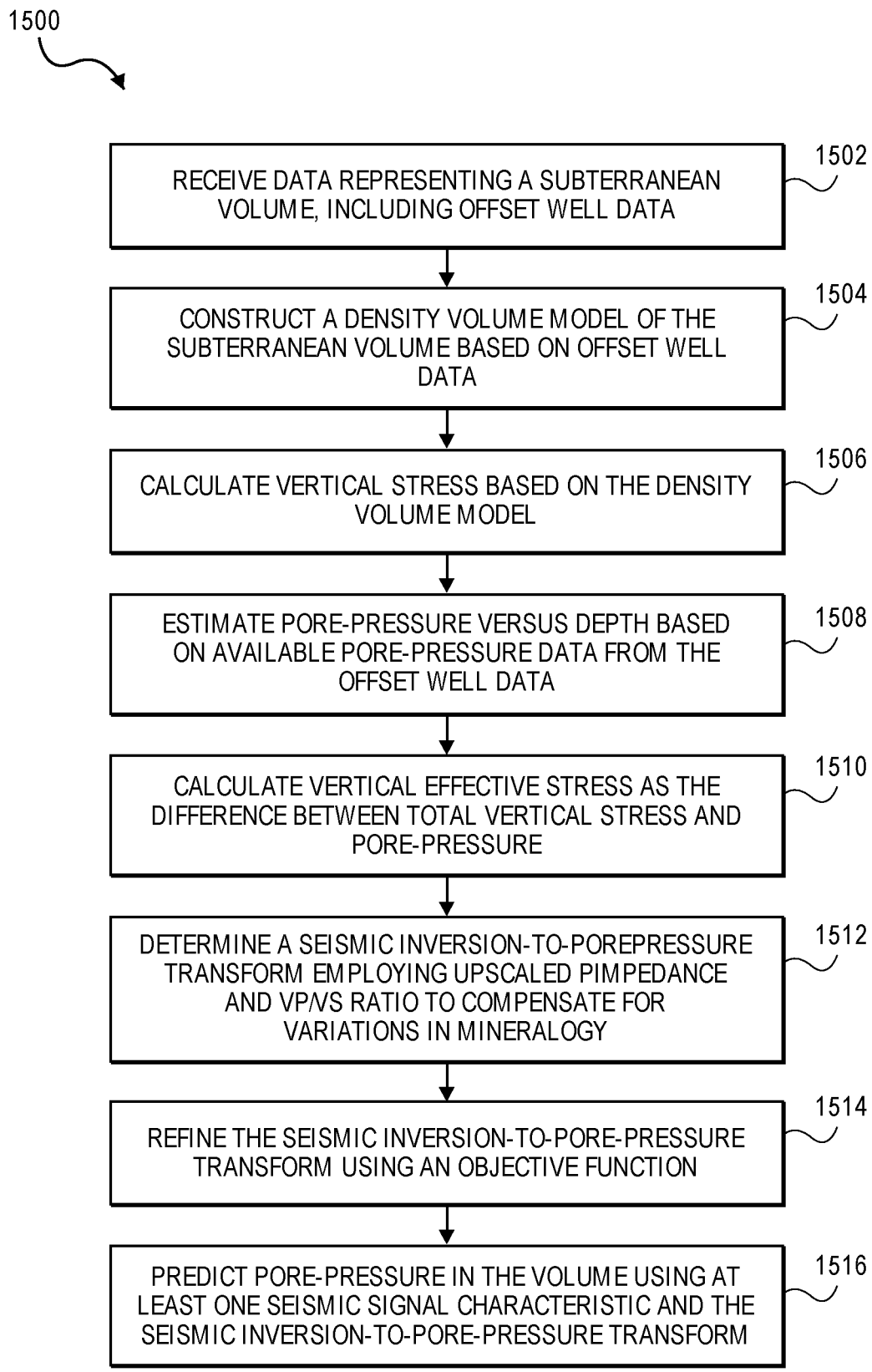
FIG. 15 illustrates a flowchart of an example method for predicting pore pressure, according to an embodiment.

FIG. 15 illustrates a flowchart of a method 1500 for calculating pore pressure in a formation, according to an embodiment. At block 1502, the method 1500 can begin by obtaining formation data, such as offset well data (e.g., borehole directional surveys or wireline logs (e.g., compressional sonic data logs, shear sonic data logs, density data logs, gamma-ray data logs, neutron data logs, and caliper data logs, among others)). The formation data can also include depth values corresponding to formation tops, and/or detailed lithology (rock composition) information, among other information, from cores associated with particular formations.

At block 1504, the method 1500 can proceed to constructing a density volume (e.g., in two-dimensions or three-dimensions), based on the formation data. In some embodiments, constructing a density volume can include kriging density logs from each available well. In some examples, constructing a density volume can include deriving a locally-calibrated relation between log density and seismic inverted P-impedance at seismic traces collocated with available wells, and applying this calibrated relation to estimate density at any number of seismic trace locations.

At block 1506, the method 1500 can include calculating vertical stress by vertically integrating density values versus depth values. In some examples, the vertical stress is calculated based on Equation 3 described above. At block 1508, the method 1500 can include compiling and interpreting the available pore pressure data: from RFTs (Repeat Formation Test), MDTs (Modular Dynamic Test), DFITs (Diagnostic Fracture Injection Test), drilling reports, mud weight profiles, hydraulic fracture data such as ISIPs (Instantaneous Shut-In Pressure), and fracture closure pressures, among others. In some examples, the method 1500 can arrive at an estimate of pore pressure versus depth in these wells based on the compiled and interpreted pore pressure data. In some embodiments, different estimates of pore pressure from the various listed sources along a well are compiled and can, for example, be interpolated to give a pore pressure at every point along a well. This interpolation can be simple or may use different relations in the different lithologies.

In some examples, the method 1500 can also include calculating vertical effective stress as the difference between total vertical stress and pore pressure. For example, Equation 2 described above can be used to calculate the vertical effective stress.

At block 1510, the method 1500 can further include upscaling sonic velocities and density values to obtain estimate values representative of the depth resolution obtained via pre-stack seismic inversion. In some embodiments, the method 1500 can also include determining a seismic inversion-to-pore-pressure transform using the upscaled density and sonic and employing upscaled P-impedance and $V_P/V_S$ ratio to compensate for variations in mineralogy, as at 1512. Two examples of such am inversion-to-pore-pressure transform include the expressions: $\sigma_V \equiv S_V - \alpha P_p = a_0 + a_1 I_P + a_2 V_P/V_S$, and $P_p = a_0 + a_1 I_P + a_2 V_P/V_S + a_3 S_V$. In some examples, the coefficients a0, a1, a2, and a3 can be obtained using any suitable best fit mathematical operation.

There are many possible alternative relations for the inversion-to-pore-pressure transform. For example, the inversion-to-pore-pressure transform can be based on any suitable variables and/or equations such as $(P_p, I_P, V_P/V_S,$ and $S_V)$, $(P_p, I_P, I_S,$ and $S_V)$, or $(P_p, \lambda\rho(=I_p^2-2I_s^2), \mu\rho(=I_s^2),$ and $S_V)$. Pp represents pore pressure in these equations. These variations can be used without departing from the approach described herein. Also, while the example expressions listed above may be linear, non-linear relations between the various quantities can also be used to determine the seismic inversion-to-pore-pressure transform.

In some embodiments, the method 1500 can further include refining the seismic inversion-to-pore-pressure transform using an objective function, such as at block 1514. The objective function may, for example, involve the sum of squared differences between measured and predicted pore pressure. The objective function can, in some examples, include two or more terms with different weights. The first term can minimize the difference between measured and predicted pore pressure, while the second term can penalize solutions that produce large fluctuations in predicted pore pressure for a given formation as a function of depth resulting from variation in rock composition within the formation (e.g., to provide a piece-wise smooth result). One example of such a second term may penalize large second derivatives.

In some embodiments, the method 1500 can also include predicting pore-pressure in a volume using at least one result of seismic inversion and the seismic inversion-to-pore-pressure transform at block 1516. In some embodiments, the seismic inversion can include P-impedance values and S-impedance values. In some examples, the seismic inversion can include P-impedance values and Vp/Vs values.

It is to be understood that the method 1500 can be implemented with any number of fewer or additional blocks. Furthermore, the method 1500 can be implemented in the order illustrated in the example process flow diagram of FIG. 15, or in any other suitable order.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 16:
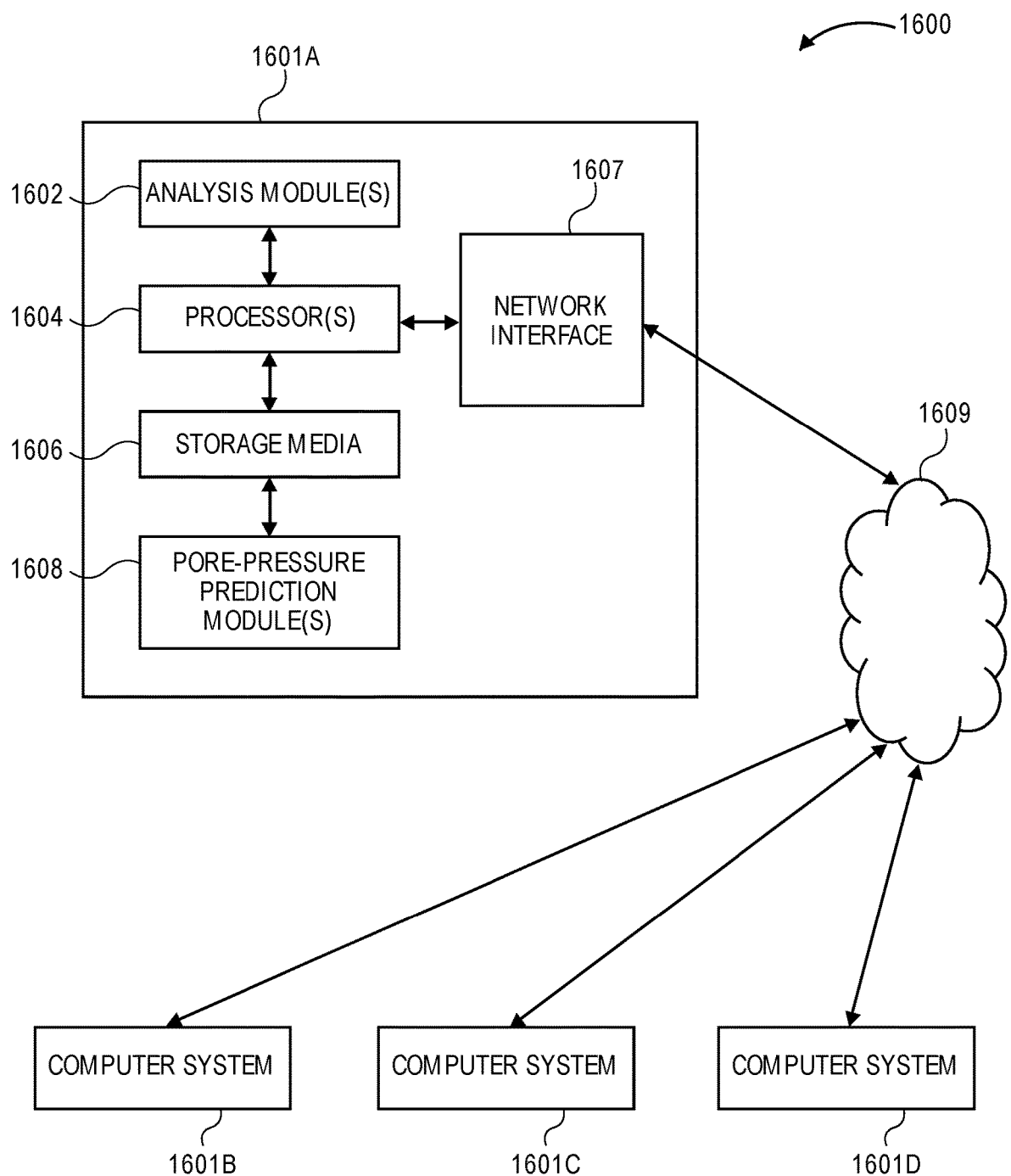
FIG. 16 illustrates a schematic view of a computing system, according to an embodiment.

In some embodiments, any of the methods of the present disclosure may be executed by a computing system. FIG. 16 illustrates an example of such a computing system 1600, in accordance with some embodiments. The computing system 1600 may include a computer or computer system 1601A, which may be an individual computer system 1601A or an arrangement of distributed computer systems. The computer system 1601A includes one or more analysis module(s) 1602 configured to perform various tasks according to some embodiments, such as one or more methods disclosed herein. To perform these various tasks, the analysis module 1602 executes independently, or in coordination with, one or more processors 1604, which is (or are) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor can include a microprocessor, microcontroller, processor module or subsystem, programmable integrated circuit, programmable gate array, or another control or computing device.

The storage media 1606 can be implemented as one or more computer-readable or machine-readable storage media. Note that while in the example embodiment of FIG. 16 storage media 1606 is depicted as within computer system 1601A, in some embodiments, storage media 1606 may be distributed within and/or across multiple internal and/or external enclosures of computing system 1601A and/or additional computing systems. Storage media 1606 may include one or more different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1600 contains one or more pore-pressure prediction module(s) 1608. In the example of computing system 1600, computer system 1601A includes the pore-pressure prediction module 1608. In some embodiments, a single pore-pressure prediction module may be used to perform some or all aspects of one or more embodiments of the methods. In alternate embodiments, a plurality of pore-pressure prediction modules may be used to perform some or all aspects of methods.

It should be appreciated that computing system 1600 is only one example of a computing system, and that computing system 1600 may have more or fewer components than shown, may combine additional components not depicted in the example embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the techniques herein.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1600, FIG. 16), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the techniques herein and their practical applications, to thereby enable others skilled in the art to best utilize the various embodiments and various modifications as are suited to the particular use contemplated.

What is claimed is:

1. A method of predicting pore pressure based on seismic data, comprising:
   obtaining seismic inversion data based in part on seismic data collected from a formation, wherein the seismic inversion data comprises seismic impedance data, and wherein the seismic impedance data comprises a P-velocity value divided by an S-velocity value;
   calculating a pore-pressure transform, wherein the pore-pressure transform comprises one or more parameters derived using measured pore pressure data, at least one upscaled sonic log, and at least one density log, wherein the pore-pressure transform comprises an objective function to reduce unphysical variations in predicted pore pressure corresponding to depth, and wherein the objective function comprises a first term and a second term;
   adjusting the pore-pressure transform for sampling bias caused by pore pressure measurements being restricted to a plurality of lithologies by accounting for a difference between upscaled seismic velocities and average sonic velocities within each of the lithologies;
   generating one or more pore pressure prediction values based on the pore-pressure transform for the lithologies and the seismic inversion data; and
   generating an image that shows the pore pressure versus the depth, wherein the image is based at least partially upon the one or more pore pressure prediction values.

2. The method of claim 1, wherein the seismic impedance data comprises one or more P-impedance values and one or more S-impedance values.

3. The method of claim 1, wherein the seismic impedance data comprises at least one P-impedance value and a set of values calculated based on a relationship between the P-velocity value, the S-velocity value, a P-impedance value, and an S-impedance value.

4. The method of claim 1, where the seismic impedance data comprises a set of impedance values calculated based on one or more P-impedance values and one or more S-impedance values, or at least one squared S-impedance value.

5. The method of claim 1, wherein generating the one or more pore pressure prediction values comprises calculating the sampling bias in the pore pressure measurements based on pressure measurements in a subset of the lithologies.

6. The method of claim 1, wherein the objective function comprises a term that is configured to produce a piecewise smooth pore-pressure prediction.

7. The method of claim 6, wherein the objective function is configured to produce the piecewise smooth pore-pressure prediction by detecting and penalizing predicted pore pressures having second derivatives that exceed a threshold with respect to a depth value in the formation.

8. The method of claim 1, further comprising generating the seismic model, wherein the seismic model is a three-dimensional representation of the one or more pore pressure values, the three-dimensional representation to be stored on a local storage device or transmitted to a remote storage device.

9. The method of claim 8, further comprising modifying a resource extraction technique based on the three-dimensional representation of the one or more pore pressure values.

10. The method of claim 1, wherein the seismic inversion data comprises pre-stack seismic inversion data.

11. The method of claim 1, wherein the seismic inversion data is obtained simultaneously with the pore-pressure transform being calculated, and wherein the one or more parameters comprise a vertical stress.

12. The method of claim 1, wherein the seismic impedance data also comprises a P-impedance value and an S-impedance value, and further comprising applying the adjusted pore-pressure transform to the to the P-impedance value and the S-impedance value to produce one or more transformed values.

13. The method of claim 12, wherein the adjusted pore-pressure transform is also applied to the P-velocity value divided by the S-velocity value to produce the one or more transformed values.

14. The method of claim 13, wherein the one or more pore pressure prediction values are generated based at least partially upon the one or more transformed values.

15. The method of claim 1, wherein the objective function is equal to a sum of squared differences between the measured pore pressure data and the predicted pore pressure.

16. The method of claim 1, wherein the first term and the second term have different weights.

17. The method of claim 1, wherein the first term reduces the unphysical variations in the predicted pore pressure corresponding to depth by minimizing differences between the measured pore pressure data and the predicted pore pressure.

18. The method of claim 17, wherein the unphysical variations are due to lithologies corresponding to the measured pore pressure data not matching lithologies corresponding to the predicted pore pressure.

19. The method of claim 1, wherein the second term penalizes solutions having a second derivative that is larger than a predetermined threshold.

20. The method of claim 19, wherein the second derivative is with respect to the depth in the formation.

21. A system for predicting pore pressure based on seismic data, comprising:
   a processor to execute computer-readable instructions that, in response to execution of the computer-readable instructions, cause the processor to perform operations comprising:
   obtaining seismic inversion data based in part on seismic data collected from a formation, wherein the seismic inversion data comprises seismic impedance data, and wherein the seismic impedance data comprises a P-velocity value divided by an S-velocity value;
   calculating a pore-pressure transform, wherein the pore-pressure transform comprises one or more parameters derived using measured pore pressure data, at least one upscaled sonic log, and at least one density log, wherein the pore-pressure transform comprises an objective function to reduce unphysical variations in predicted pore pressure corresponding to depth, and wherein the objective function comprises a first term and a second term;

adjusting the pore-pressure transform for sampling bias caused by pore pressure measurements being restricted to a plurality of lithologies by accounting for a difference between upscaled seismic velocities and average sonic velocities within each of the lithologies;

generating one or more pore pressure prediction values based on the pore-pressure transform for the lithologies and the seismic inversion data; and generating an image that shows the pore pressure versus the depth, wherein the image is based at least partially upon the one or more pore pressure prediction values.

22. A non-transitory computer-readable medium for predicting pore pressure based on seismic data, comprising a plurality of computer-readable instructions that, in response to execution of the computer-readable instructions by a processor, cause the processor to perform operations comprising:

obtaining seismic inversion data based in part on seismic data collected from a formation, wherein the seismic inversion data comprises seismic impedance data, and wherein the seismic impedance data comprises a P-velocity value divided by an S-velocity value;

calculating a pore-pressure transform, wherein the pore-pressure transform comprises one or more parameters derived using measured pore pressure data, at least one upscaled sonic log, and at least one density log, wherein the pore-pressure transform comprises an objective function to reduce unphysical variations in predicted pore pressure corresponding to depth, and wherein the objective function comprises a first term and a second term;

adjusting the pore-pressure transform for sampling bias caused by pore pressure measurements being restricted to a plurality of lithologies by accounting for a difference between upscaled seismic velocities and average sonic velocities within each of the lithologies;

generating one or more pore pressure prediction values based on the pore-pressure transform for the lithologies and the seismic inversion data; and generating an image that shows the pore pressure versus the depth, wherein the image is based at least partially upon the one or more pore pressure prediction values.

* * * * *